US012229127B2

(12) United States Patent
Bakir et al.

(10) Patent No.: US 12,229,127 B2
(45) Date of Patent: Feb. 18, 2025

(54) ASSISTIVE BROWSING USING CONTEXT (71) Applicant: GOOGLE LLC, Mountain View, CA (US)

(72) Inventors: Gokhan H. Bakir, Zurich (CH); Behshad Behzadi, Freienbach (CH); Marcin M. Nowak-Przygodzki, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/977,601

(22) Filed: Oct. 31, 2022

(65) Prior Publication Data
US 2023/0047212 A1 Feb. 16, 2023

Related U.S. Application Data (63) Continuation of application No. 16/667,823, filed on Oct. 29, 2019, now Pat. No. 11,487,757, which is a
(Continued)

(51) Int. Cl.
G06F 16/248 (2019.01)
G06F 16/2453 (2019.01)
(Continued)

(52) U.S. Cl.
CPC ...... G06F 16/24534 (2019.01); G06F 16/248 (2019.01); G06F 16/9535 (2019.01); G06F 40/143 (2020.01); H04L 67/02 (2013.01)

(58) Field of Classification Search
CPC ............. G06F 16/24534; G06F 16/248; G06F 16/9535; H04L 67/02
See application file for complete search history.

(56) References Cited

U.S. PATENT DOCUMENTS 6,434,561 B1 8/2002 Durst et al.
7,409,402 B1 8/2008 Chan et al.
(Continued)

FOREIGN PATENT DOCUMENTS

CN 1489740 4/2004
CN 104011721 8/2014
WO 2013130215 9/2013

OTHER PUBLICATIONS

Hattori et al., Context-Aware Query Refinement for Mobile Web Search, Proceedings of the 2007 International Symposium on Applications and the Internet Workshops (SAINTW'07), pp. 1-4. (Year: 2007).*

(Continued)

Primary Examiner — Cheyne D Ly
(74) Attorney, Agent, or Firm — Gray Ice Higdon (57) ABSTRACT Methods, systems, and apparatus, including computer programs encoded on a computer storage medium, for receiving a query provided by a user and comprising one or more terms. Obtaining context data based on at least a portion of a first resource displayed to the user at a time that the query is received. Obtaining a revised query that is based on the query and the context data. Receiving a plurality of search results responsive to the revised query. Automatically, selecting a search result that represents a second resource from the plurality of search results, and providing the second resource for display to the user.

20 Claims, 5 Drawing Sheets

Related U.S. Application Data continuation of application No. 14/881,336, filed on Oct. 13, 2015, now Pat. No. 10,503,733.

(60) Provisional application No. 62/063,644, filed on Oct. 14, 2014.

(51) Int. Cl.
*G06F 16/9535* (2019.01)
*G06F 40/143* (2020.01)
*H04L 67/02* (2022.01)

(56) References Cited

U.S. PATENT DOCUMENTS

| | | | |
|---|---|---|---|
| 7,421,441 B1 | 9/2008 | Chan et al. | |
| 7,603,349 B1 | 10/2009 | Kraft et al. | |
| 7,831,588 B2 | 11/2010 | Jones et al. | |
| 7,917,528 B1* | 3/2011 | Dave | G06F 16/3322 |
| | | | 707/766 |
| 7,974,964 B2 | 7/2011 | Cucerzan et al. | |
| 8,108,385 B2 | 1/2012 | Kraft et al. | |
| 8,117,196 B2 | 2/2012 | Jones et al. | |
| 8,489,641 B1* | 7/2013 | Seefeld | G06F 16/9537 |
| | | | 715/788 |
| 9,104,750 B1 | 8/2015 | Dhamdhere et al. | |
| 10,503,733 B2 | 12/2019 | Bakir et al. | |
| 2003/0182258 A1 | 9/2003 | Sakamoto et al. | |
| 2004/0267730 A1 | 12/2004 | Dumais et al. | |
| 2005/0033641 A1 | 2/2005 | Jha et al. | |
| 2006/0248061 A1 | 11/2006 | Kulakow et al. | |
| 2006/0271524 A1* | 11/2006 | Tanne | G06F 16/24578 |
| 2007/0038601 A1* | 2/2007 | Guha | G06F 16/332 |
| 2007/0038603 A1 | 2/2007 | Guha | |
| 2007/0174257 A1 | 7/2007 | Howard | |
| 2007/0286360 A1 | 12/2007 | Chu et al. | |
| 2008/0133504 A1* | 6/2008 | Messer | G06F 16/9535 |
| | | | 707/999.005 |
| 2010/0105370 A1* | 4/2010 | Kruzeniski | G06F 16/951 |
| | | | 455/414.3 |
| 2010/0332470 A1 | 12/2010 | Farkash et al. | |
| 2011/0161309 A1 | 6/2011 | Lung et al. | |
| 2011/0219319 A1 | 9/2011 | Chen et al. | |
| 2011/0252343 A1 | 10/2011 | Broman et al. | |
| 2012/0084279 A1* | 4/2012 | Driscoll | G06F 16/9538 |
| | | | 707/E17.014 |
| 2013/0110627 A1 | 5/2013 | Guha | |
| 2013/0166528 A1 | 6/2013 | Morris | |
| 2013/0226935 A1 | 8/2013 | Bai | |
| 2014/0149390 A1 | 5/2014 | Chen et al. | |
| 2014/0172899 A1* | 6/2014 | Hakkani-Tur | G06F 16/24534 |
| | | | 707/759 |
| 2014/0188894 A1 | 7/2014 | Chechik et al. | |
| 2014/0214820 A1 | 7/2014 | ODonnell | |
| 2015/0134444 A1* | 5/2015 | Liang | G06Q 50/01 |
| | | | 705/14.55 |
| 2020/0065304 A1 | 2/2020 | Bakir et al. | |

OTHER PUBLICATIONS

Kawashige et all., Context Matcher: Improved Web Search Using Query Term Context in Source Document and in Search Results APWeb 2006: Frontiers of WWW Research and Development—APWeb 2006 pp. 486-497. (Year: 2006).*

Anderson, N., Putting Search in Context: Using Dynamically-Weighted Information Fusion to Improve Search Results, 2011 Eighth International Conference on Information Technology: New Generations, pp. 66-71. (Year: 2011).*

Anderson et al.; Eighth International Conference on Information Technology: New Generations; pp. 66-71; dated 2011.

Chinese Patent Office; Office Action issued in Application No. 201580035660; 4 pages; dated Mar. 4, 2020.

European Patent Office; International Search Report and Written Opinion in Application No. PCT/US2015/055332; 12 pages; dated Jan. 7, 2017.

European Patent Office; International Preliminary Report on Patentability issued in Application No. PCT/US2015/055332; 9 pages; dated Apr. 27, 2017.

European Patent Office; Office Action issued in Application No. 15784903.5; 6 pages; dated Mar. 5, 2018.

Chinese Patent Office; Office Action issued in Application No. 201580035660.6; 10 pages; dated Feb. 27, 2019.

* cited by examiner

ASSISTIVE BROWSING USING CONTEXT

BACKGROUND

The Internet provides access to a wide variety of resources, such as image files, audio files, video files, and webpages. A search system can identify resources in response to queries submitted by users and provide information about the resources in a manner that is useful to the users. The users can navigate through, e.g., select, search results to acquire information of interest.

SUMMARY

This specification relates to assisting users in interactions with computer-implemented information retrieval systems.

Implementations of the present disclosure are generally directed to automatically selecting a search result responsive to a user query based on context provided from a resource, and navigating to a resource represented by the search result. More particularly, implementations of the present disclosure are directed to using context data associated with a first resource displayed to a user at a time of a query, e.g., when the query was sent, or when the query was received, selecting a search result based on a context of the first resource, and displaying a second resource represented by the search result to the user. In some examples, a revised query is obtained based on the query and the context data, and a plurality of search results are provided based on the revised query. The search result is selected from the plurality of search results. In some examples, the second resource is displayed to the user in place of the first resource. In some examples, the first resource is displayed to the user in a first window, and the second resource is displayed to the user in second window.

In general, innovative aspects of the subject matter described in this specification can be embodied in methods that include actions of receiving a query provided by a user and comprising one or more terms. Obtaining context data based on at least a portion of a first resource displayed to the user at a time that the query is received. Obtaining a revised query that is based on the query and the context data. Receiving a plurality of search results responsive to the revised query. Automatically, selecting a search result that represents a second resource from the plurality of search results, and providing the second resource for display to the user. Other implementations of this aspect include corresponding systems, apparatus, and computer programs, configured to perform the actions of the methods, encoded on computer storage devices.

These and other implementations can each optionally include one or more of the following features. The search result can be selected at least partially in response to determining that a domain from which the second resource originates is the domain from which the first resource originates. The search result website can be selected at least partially in response to determining that the first resource comprises a link to the second resource. The first resource and the second resource can include respective webpages.

The first resource and the second resource can be displayed by a web browser executed by a computing device. Providing the second resource for display to the user can include providing instructions to cause a web browser to open a tab and display the second resource in the tab. Obtaining a revised query can include providing the query and the context data to a query revision engine, and receiving the revised query from the query revision engine.

Particular implementations of the subject matter described in this specification can be implemented so as to realize one or more of the following advantages. A user may enter plain language queries while reviewing a web resource and swiftly receive another relevant web resource. A user be permitted to effortlessly search a topic tangential to a displayed resource, review a resource on the tangential topic, and then continue reviewing the displayed resource.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A, FIG. 2B, FIG. 2C depict an example use case in accordance with implementations of the present disclosure.

Like reference numbers and designations in the various drawings indicate like elements.

DETAILED DESCRIPTION

Implementations of the present disclosure are generally directed to automatically selecting a search result responsive to a user query based on context provided from a resource, and navigating to a resource represented by the search result. More particularly, implementations of the present disclosure are directed to using context data associated with a first resource displayed to a user at a time of a query, e.g., when the query was sent, or when the query was received, selecting a search result based on a context of the first resource, and displaying a second resource represented by the search result to the user. In some examples, a revised query is obtained based on the query and the context data, and a plurality of search results are provided based on the revised query. The search result is selected from the plurality of search results. In some examples, the second resource is displayed to the user in place of the first resource. In some examples, the first resource is displayed to the user in a first window, and the second resource is displayed to the user in second window.

Figure 1:
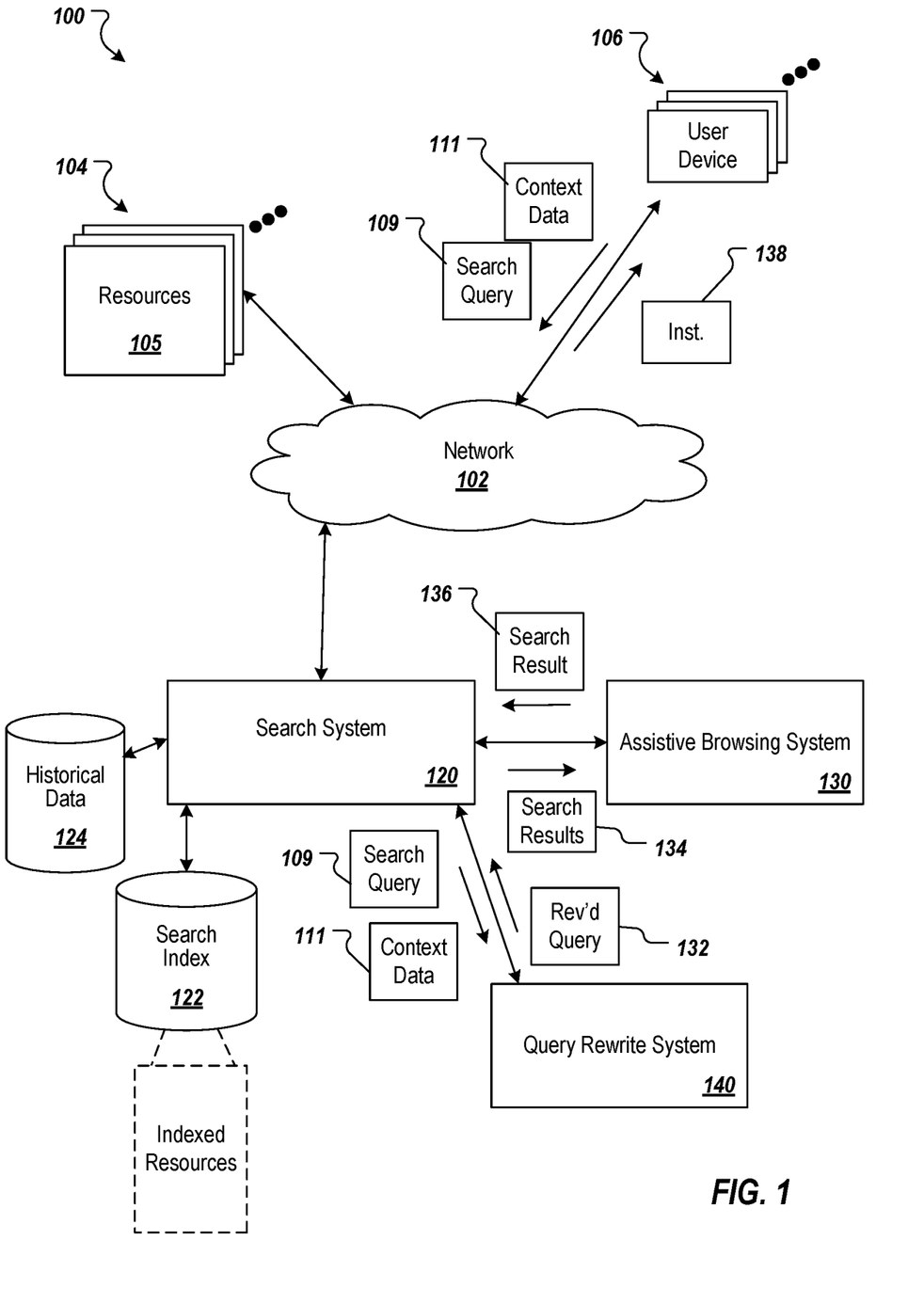
FIG. 1 depicts an example environment in which a search system provides a search result based on a user query.

FIG. 1 depicts an example environment 100 in which a search system provides search results based on user queries. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, connecting websites 104, user devices 106, and the search system 120. In some examples, the network 102 can be accessed over a wired and/or a wireless communications link. For example, mobile computing devices, such as smartphones can utilize a cellular network to access the network 102. The environment 100 may include millions of websites 104 and user devices 106.

In some examples, a website 104 is provided as one or more resources 105 associated with a domain name and hosted by one or more servers. An example website is a collection of webpages formatted in an appropriate machine-readable language, e.g., hypertext markup language (HTML) that can contain text, images, multimedia content, and programming elements, e.g., scripts. Each website 104 is maintained by a publisher, e.g., an entity that manages and/or owns the website.

In some examples, a resource 105 is data provided over the network 102 that is associated with a resource address, e.g., a uniform resource locator (URL). In some examples, resources 105 that can be provided by a website 104 include webpages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided in domains, e.g., websites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, provides search results representing respective resources 105, and can return the search results to the user devices 106. In an example context, a search results display can include one or more webpages, e.g., one or more search results pages. In some examples, a webpage can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result is data generated by the search system 120 that represents a resource 105 that is responsive to a particular search query, and includes a link to the resource 105. An example search result can include a webpage title, a snippet of text or a portion of an image extracted from the webpage, and the URL of the webpage. In some examples, data provided in the search results can be retrieved from a resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results provided in response to each search query 109 are also stored in the historical data store 124, for example, by the search system 120. These actions can include whether a search result was selected, e.g., clicked or hovered over with a pointer. The selection data can also include, for each selection of a search result, data identifying the search query 109 for which the search result was provided.

In accordance with implementations of the present disclosure, the example environment 100 also includes an assistive browsing system 130 and a query rewrite system 140 communicably coupled to the search system 120, e.g., directly coupled or coupled over a network such as network 102. Although the search system 120, the assistive browsing system 130, and the query rewrite system 140 are depicted as separate systems in FIG. 1, it is contemplated that the search system 120 can include the assistive browsing system 130 and/or the query rewrite system 140.

In some implementations, and as described in further detail herein, the query rewrite system 140 provides a revised query 132 based on a query 109 from a user device 106. In some examples, and as described in further detail herein, the revised query 132 is provided based on context data 111 that was received from a user device 106, and is related to a resource 105 displayed to a user on the user device 106 at a time of the query. In some examples, the time of the query includes a time, at which the query was sent from the user device 106. In some examples, the time of the query includes a time, at which the query is received by the search system 120. In some examples, the search system 120 provides search results 134 that are responsive to the revised query 132 to the assistive browsing system 130. In some examples, a search result 136 is automatically selected from among the plurality of search results 134, and instructions 138 are provided to the user device 106. In some examples, the instructions are executed, e.g., by a web browser, to display the resource represented by the selected search result on the user device 106.

Implementations of the present disclosure are generally directed to automatically selecting a search result responsive to a query based on context provided from a resource, and navigating to a resource represented by the search result. More particularly, implementations of the present disclosure are directed to using context data associated with a first resource displayed to a user at a time of a query, e.g., when the query was sent, or when the query was received, selecting a search result based on the query and a context of the first resource, and displaying a second resource represented by the search result to the user. In some examples, a revised query is obtained based on the query and the context data, and a plurality of search results are provided based on the revised query. The search result is selected from the plurality of search results. In some examples, instructions are provided that, when executed, cause the second resource to be displayed to the user. For example, the instructions can provide that a URL assigned to the second resource is to be automatically input to an address bar of a web browser, to prompt the web browser to retrieve and display the second resource.

In some implementations, a user submits a query while viewing a first resource displayed on a user device, e.g., by entering the query in an address bar of a web browser. For example, the user can submit a query while viewing a particular webpage, e.g., first resource, displayed in a web browser executed by the user device. In some examples, the query is related to an aspect of the first resource that the user is viewing. For example, the user may desire to learn more about a topic mentioned in the particular webpage (first resource), but not described in detail. Consequently, the user's query can be directed to that topic. In response, context data related to the first resource can be obtained.

In some examples, the context data can be provided from the user device. For example, the user device can provide context data that can include content of the first resource that is displayed to the user when submitting the query. That is, for example the user device transmits the query and context data, e.g., to the search system 120. In some examples, context data is retrieved. For example, the URL of the first resource can be submitted with the query, e.g., to the search system 120. In some examples, the search system and/or as assistive browsing system, e.g., the assistive browsing system, can retrieve the first resource using the URL, and can obtain context data (content) from the first resource.

In some implementations, a revised query is provided based on the query and the context data. For example, the query and the context data are provided to a query rewrite system, which provides the revised query based on one or more terms of the original query and the context data. In some implementations, the search system obtains search results based on the revised query, the search results being responsive to the revised query. For example, the search system can use the revised query as input to a search index, e.g., the search index 122, which provides the search results in response. In some implementations, a search result is automatically, e.g., without requiring user selection or intervention, selected from the search results. For example, the assistive browsing system can select a search result from the search results. In some examples, the search result represents a second resource, e.g., a webpage. The second resource is displayed to the user. For example, instructions can be transmitted to the user device, and can include instructions to input a URL assigned to the second resource into an address bar of a web browser. The user device can executed the instructions such that the second resource is automatically displayed on the user device.

In accordance with implementations of the present disclosure, a query can include a textual query, e.g., one or more terms typed into a search bar or address bar of a web browser. A search query also can include a voice query, e.g., one or more terms spoken into a user device, such as a smartphone. In some implementations, a query can be spoken or entered using conversational language, e.g., by implicitly referring to conventional information displayed to the user. For example, the user may be viewing a library webpage that displaying a book written by Mark Twain, and submit a query such as, "Are there any other books by this author?" In some implementations, a query can include a one or more terms phrased as a command, e.g., "show me arrival times" submitted while a user is viewing an airline's webpage.

In some examples, a user device may recognize a query as a contextual query based on the terms used in the query. And, in some implementations, a user may provide a positive indication that a query is contextual query, e.g., a user selectable control or a contextual search toolbar may be used to designate a query as a contextual query.

In some examples, the context data can be obtained by the user device. The context data can include any appropriate data associated with and/or provided in a resource displayed, e.g., a webpage displayed in an active web browser window, on the user device at a time of the query, and can include, for example, displayable text, images, metadata, code, e.g., HTML code, the URL of the resource or portions thereof, e.g., the web domain or website that hosts the resource, and/or hyperlinks to other resources. In some examples, the context data may be obtained from a portion of or from the entire resource. In some examples, the context data may be obtained only from a particular portion or particular portions of the resource. For example, assume a user is viewing a webpage including a long written article that includes portions of text not displayed on the user device. The user device may track the portions of text that the user views and only extract textual context data from those previously viewed portions of the webpage. As a result, portions of the webpage which the user has not viewed, and therefore, presumably has not read, will not be used as context data, and consequently, will not be considered in creating a revised query.

As introduced above, the query rewrite system may be included as a part of a search system or may be a separate system communicably coupled to the search system, e.g., directly or via one or more networks. In some implementations, a user device may send a query and context data to the search system, and the search system may then provide the query and context data to the query rewrite system to obtain a revised query. In some implementations, user devices also may be communicably coupled to the query rewrite system, e.g., by one or more networks. In such implementations, a user device may send a query and context data to the query rewrite system to obtain a revised query, and then submit the revised query to the search system.

In some implementations, a revised query may include a modified version of the user submitted query. Such modifications may include, for example, incorporating context data into the terms of the user submitted query, replacing one or more terms of the user submitted query with context data, rearranging terms of the user submitted query, rephrasing or paraphrasing the user submitted query based on context data, or any combination of the preceding.

For example, and as described in more detail below in reference to FIGS. 2A-2C, a user submit a query [what are his memoirs about], while viewing a webpage about Barack Obama. The query rewrite system may recognize, based on context data associated with the webpage, e.g., webpage text, that the pronoun "his" in the query refers to Barack Obama, and hence, may provide a revised query such as, e.g., [what are Barack Obama's memoirs about] to the search system and/or to the user device.

Moreover, context data used to modify a search need not be related to the main topic of a web resource, as was the case in the previous example. In another example, a user may be viewing a webpage about Los Angeles Lakers guard Kobe Bryant and submit the query [when is the next game]. The query rewrite system may recognize, based on context data associated with the webpage, e.g., webpage text, metadata, and/or URL, that the query refers to the Los Angeles Lakers, and thus, may provide a revised query such as, e.g., [when is the Laker's next game] or [Lakers schedule] to the search system and/or to the user device.

In some examples, the revised query also may be based on search history data. The search history data may include data related to searches performed by the user performing the search or multiple users. In some examples, the search history data can be statistical data related to consecutive search patterns. For example, the data may describe common search patterns, e.g., after users read about topic A they typically search for topic B.

Once a revised query is obtained, the search system may obtain a plurality of search results responsive to the revised query. In some examples, the search results may include additional information pertaining to the search results and/or resources identified by the search results including, for example, resource metadata, resource prominence, resource quality, search result click history, and search result scores. In some examples, search results in the plurality of search results may be ranked, e.g., based on scores associated with respective search results.

In some examples, the search system and/or the assistive browsing system can process the search results and associated information to automatically, e.g., without requiring user action, select a relevant search result representing a resource that will be displayed to the user. In some implementations, the search result selected may be a search result identifying a resource that originates from the same domain, e.g., website domain, as the resource that was being displayed to the user when the user submitted the query (the "first resource"). In some examples, there may be two or more search results identifying resources that originated from the same website (web domain). In such an example, a search result of two or more search results that has the highest score may be selected. In some such examples, a search result of two or more search results may be selected based on context data from the resource being displayed when the user submitted the query, e.g., whether the resource includes a hyperlink to any of the two or more search results.

In some implementations, the search system and/or the assistive browsing system may re-rank the search results based on the context data. In some examples, search results identifying other resources indicating some relationship, e.g., based on the additional search information or the context data, to the first resource may be weighted more heavily. For example, such a relationship may include whether a resource originates from the same website as the first resource, whether the displayed resource includes a hyperlink to a resource, whether a resource has the same author as the first resource. A search result is automatically selected based on the new ranking, e.g., the top re-ranked search result is selected.

After a search result has been automatically selected, a resource identified by the selected result (the second resource) may be provided to the user device for display to the user. In other words, the search results are not presented to the user. Instead, the second resource may be automatically displayed on the user device in response to submission of the query. In some examples, the second resource may be displayed in a web browser executed by the user device. In some examples, the second resource is displayed in the same window as the first resource, thereby "replacing" the first resource, e.g., the previously displayed first resource is replaced in the web browser window with the second resource. In some examples, the second resource may be displayed as an overlay overlapping the first resource. In some examples, a new web browser tab may be opened and the second resource is displayed within the new web browser tab.

Figure 2A:
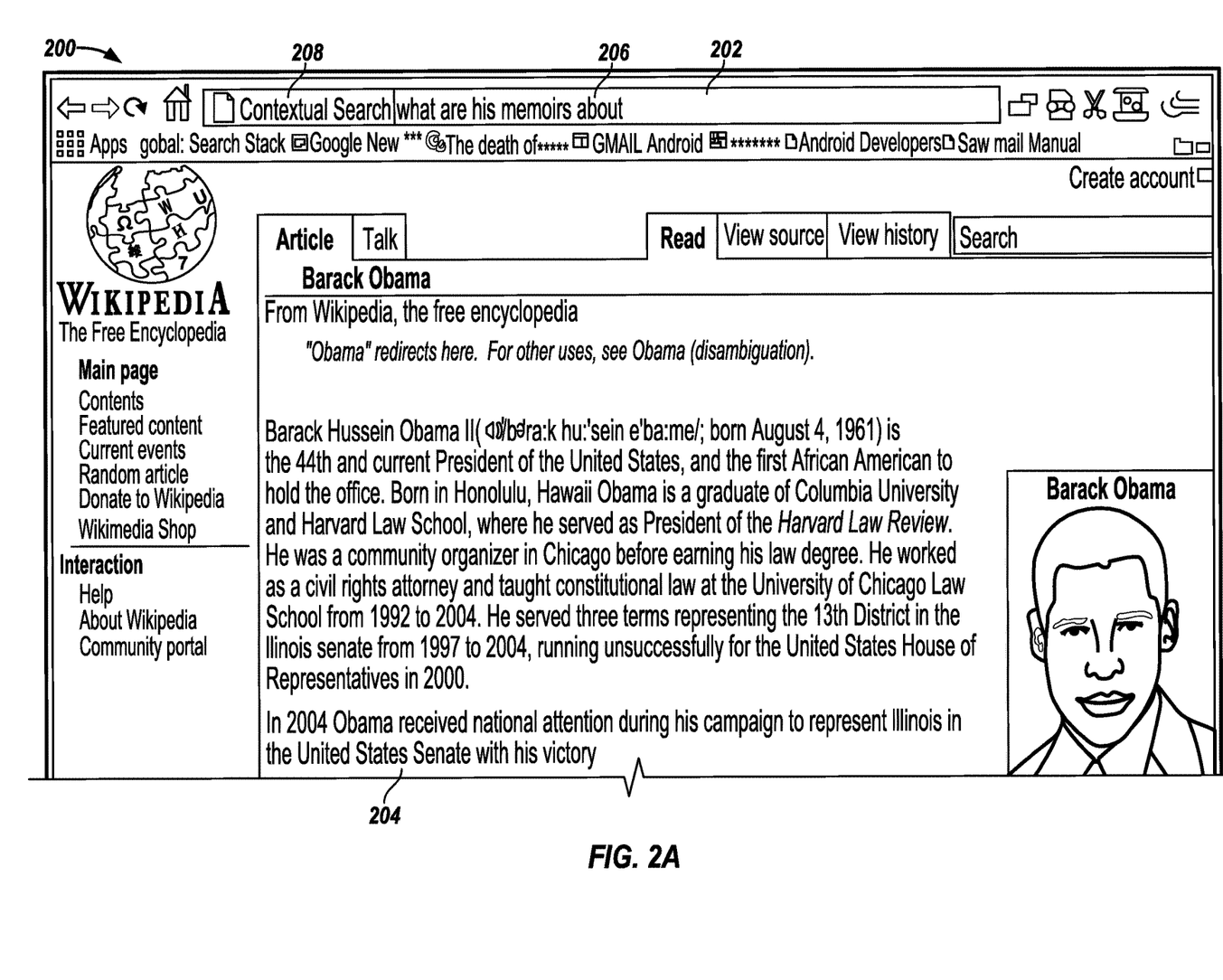

FIGS. 2A-2C depict an example use case in accordance with implementations of the present disclosure. The series of FIGS. 2A-2C provide an illustrative example of processes in accordance with implementations of the present disclosure. The example use case of FIGS. 2A-2C include an encyclopedic webpage about Barack Obama being displayed on a user device, and, while the webpage is displayed, the user searches for information about Barack Obama's memoirs entitled "Dreams from My Father."

FIGS. 2A-2C depict an example graphical user interface (GUI) 200 in accordance with implementations of the present disclosure. GUI 200 is an example web browser displayed on a user device (e.g., such as user device 106). GUI 200 includes an address bar 202 and a resource display portion 204. Referring to FIG. 2A, a Wikipedia webpage (a first resource) about Barack Obama is displayed in the resource display portion 204.

While the Barack Obama encyclopedic webpage is displayed, a user can enter the query 206 [what are his memoirs about] in the address bar 202. In some examples, a user device may recognize a query as a contextual search based on the terms used in the query. And, in some implementations, the GUI 200 may include a user selectable control 208, which may be used to designate a query as a contextual search. In some examples, a web browser may include a contextual search toolbar.

When the user submits the query 206, e.g., by pressing an "enter" key, selecting a "search" button, or finishing speaking the query; the query is sent to a search system, e.g., the search system 120, and context data associated with the webpage is obtained, e.g., provided from the user device, retrieved by the search system 120 and/or the assistive browser system 130, as described herein. A revised query is provided, e.g., from the query rewrite system 140, based on the query 206 and the context data. For example, the query rewrite system may return a revised query of [what are Barack Obama's memoirs about] based on the query 206 and context data of the displayed resource.

In some implementations, a plurality of search results are obtained based on the revised query. Example search results obtained based on the revised query [what are Barack Obama's memoirs about] may include:

Dreams from My Father—Wikipedia, URL: en.wikipedia.org/wiki/Dreams . . .

The Audacity of Hope—Wikipedia, URL: en.wikipedia.org/wiki/The_Audacity . . .

Dreams from My Father: A Story of . . . , URL: www.amazon.com/ . . .

Half-brother writes 'correction' to Obama's memoir . . . , URL: nypost.com/ . . .

New Book Raises Questions about Obama's . . . , URL: thecaucus.blogs.nytimes.com/ . . .

Tall Tales from Barack Obama's Memoir . . . , URL: www.buzzfeed.com/ . . .

Bill Ayers 'confesses' to writing Obama's memoir . . . , URL: blogs.telegraph.co.uk/ . . .

A search result is automatically selected from the plurality of search results based on the context data associated with the displayed webpage. For example, the user device automatically selects the search result Dreams from My Father—Wikipedia (a second resource), e.g., because it identifies another webpage from the same website as the first resource. In some example, search results that are responsive to the revised query may represent a diverse range of information related to the user's search topic. Consequently, using the context data from the first resource may advantageously limit the scope of relevant search results to those search results that are aligned with the intentions of the user in submitting the query. For example, in the example of FIG. 2A, the user was reading an educational article about Barack Obama on an Internet-provided encyclopedia website. Therefore, the user is likely interested in educational works about Barack Obama's memoirs and not opinion or news articles. Thus, in this example, choosing the search result from the same website is likely more in keeping with the user's intentions.

Furthermore, the example search results list two results from the Wikipedia website, Dreams from My Father—Wikipedia and The Audacity of Hope—Wikipedia. In some implementations, as described above, additional context data may be used to select between two such results. For example, the text of the Barack Obama Wikipedia webpage may identify "Dreams from My Father" as Barack Obama's memoir, and this data may be used to distinguish the results.

After a search result is automatically selected, the corresponding resource is automatically displayed to the user. Referring to FIG. 2B, in the example scenario, the Dreams from My Father Wikipedia webpage replaces the Barack Obama webpage in the display portion 204 of GUI 200. Accordingly, the plurality of search results are not presented to the user for user selection of a search result. Instead, after the user submits the query, the second resource, represented by the automatically selected search result, is displayed within GUI 200. Consequently, a user may enter plain language queries while reviewing a web resource and receive another relevant web resource without having to review a plurality of search results and having to select a search result.

Referring to FIG. 2C, in some implementations, the resource identified by the selected search result may be presented to the user in an overlay 210 providing the user with an opportunity to confirm the selected search result. For example, when the user selects (e.g., mouse clicks, taps on a touch screen, etc.) the overlay 210 the Barack Obama Wikipedia webpage may then be replaced by Dreams from My Father Wikipedia webpage in the display portion 204 of GUI 200. Thus, a user be permitted to effortlessly search a topic tangential to a displayed resource, review a resource on the tangential topic, and then continue reviewing the displayed resource. In addition, such implementations may include one or more user selectable input 212 to permit the user to cycle through search results.

Figure 3:
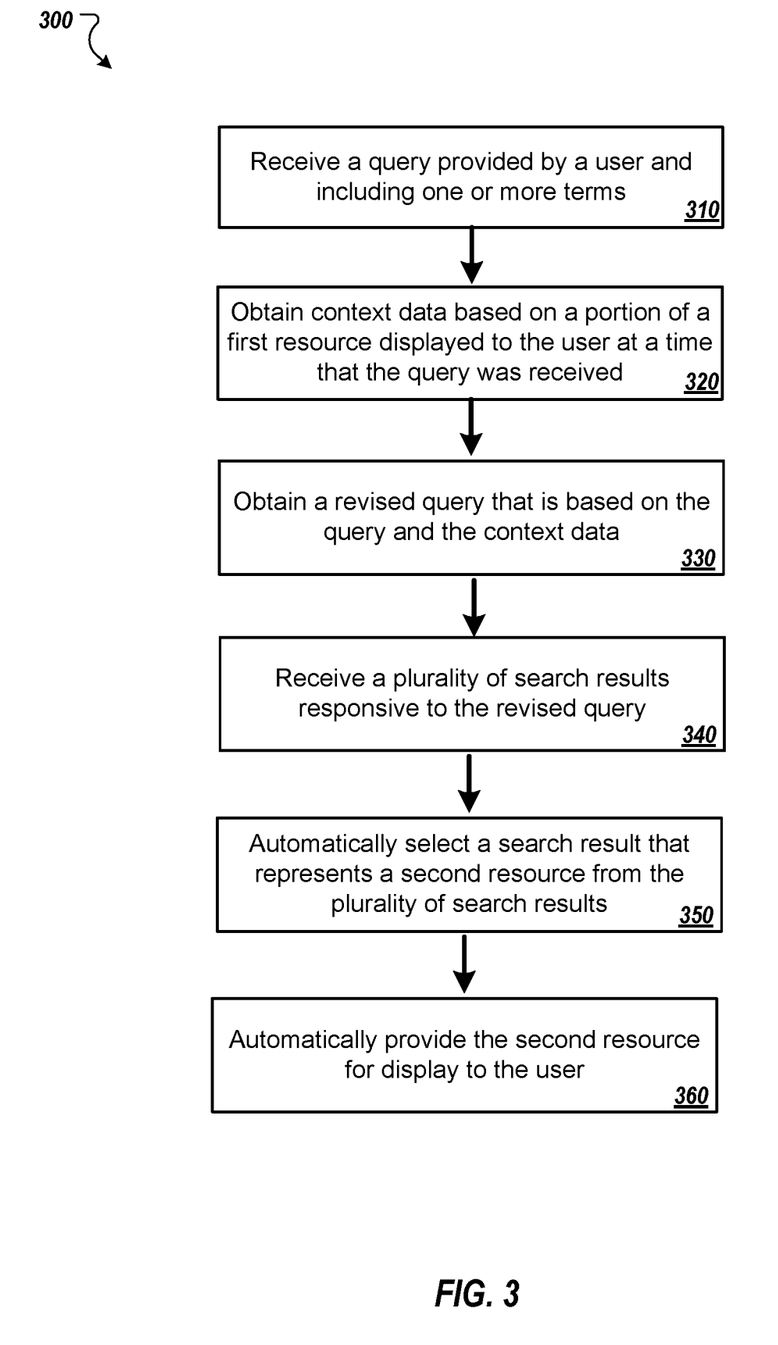
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1, e.g., the, user device 106, the search system 120, and/or the assistive browsing system 130. In some examples, the example process 300 can be provided by one or more computer-executable programs executed using one or more computing devices.

A query provided by a user and including one or more terms is received (310). For example, a user may submit a query including one or more terms into a search bar or address bar of a web browser on a user device. For example, the user can submit a query while viewing a particular webpage, e.g., first resource, displayed in a web browser executed by the user device. In some implementations, the computing device may receive a spoken query from a user, e.g., using a microphone and speech-to-text conversion capabilities of the user device. The user device may then send the query to a search system, e.g., search system 120 and/or assistive browsing system 130.

In some examples, the context data can be provided from the user device. For example, the user device can provide context data that can include content of the first resource that is displayed to the user when submitting the query. That is, for example the user device transmits the query and context data, e.g., to the search system 120. In some examples, context data is retrieved. For example, the URL of the first resource can be submitted with the query, e.g., to the search system 120. In some examples, the search system and/or as assistive browsing system, e.g., the assistive browsing system, can retrieve the first resource using the URL, and can obtain context data (content) from the first resource. In some examples, the context data may be obtained from a portion of or from the entire first resource. In some examples, the context data may be obtained only from a particular portion or particular portions of the first resource.

A revised query that is based on the query and the context data is obtained (330). For example, the query and the context data are provided to a query rewrite system, which provides the revised query based on one or more terms of the original query and the context data. In some implementations, a revised query can be obtained by providing the query and the context data to a query revision engine, and receiving the revised query from the query revision engine. The plurality of search results responsive to the revised query are then received (340). For example, the search system can use the revised query as input to a search index, e.g., a search index, which provides the search results in response.

A search result identifying a second resource is automatically selected (350). For example, an assistive browsing system or user device can automatically, e.g., without requiring user selection or intervention, select a particular one of the plurality of search results. In some examples, the search result may be selected based on the context data associated with the first resource. In some examples, the search result represents a second resource, e.g., a webpage.

Finally, the second resource is automatically, e.g., without requiring user intervention, provided for display to the user (360), e.g., the second resource can be displayed by a web browser executed by a user device. That is, from the user perspective, the second resource is automatically displayed without further user input after the user submits the query (e.g., in step 310). For example, instructions can be transmitted to the user device, and can include instructions to input a URL assigned to the second resource into an address bar of a web browser. The user device can executed the instructions such that the second resource is automatically displayed on the user device. In some implementations, the instructions may include instructions to cause a web browser to open a tab and display the second resource in the tab.

In some implementations, the search result is selected at least partially in response to determining that a domain from which the second resource originates is the domain from which the first resource originates. In some implementations, the search result website is selected at least partially in response to determining that the first resource includes a link to the second resource. In some examples, the first resource and the second resource may be respective webpages.

Various implementations described herein may provide advantages including reducing the bandwidth and computing resources required to perform searches by a computing device. For example, a user may submit a query and directly have a relevant resource displayed to the user web browser without having to perform the task of selecting a particular search result from a search result page. In other words, process 300 may eliminate the need to perform computing tasks such as the transmission of data related to a plurality of search results in a search result page between a server and a computing device, the transmission of the user selection of one of the search results between the server and the computing device, and the subsequent retrieval of the selected search server to the computing device. Instead, a relevant resource is directly displayed to a user in response to the user's query.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
    a user device comprising a processor, a computer-readable memory, one or more computer-readable storage media, and program instructions collectively stored on the one or more computer-readable storage media, the program instructions executable to:
    receive, by the user device, a first query from a user;
    provide, by the user device, the first query to a search system;
    provide, by the user device to the user, first content of a first resource as a first response to the first query, the first resource being identified by the search system as responsive to the first query;
    receive, by the user device, a second query from the user following the providing of the first response;
    in response to receiving the second query, identify, by the user device, based on the first content of the first resource having been provided to the user, context data based on the first content of the first resource;
    provide, by the user device, to the search system, (i) the second query and (ii) the context data based on the first content of the first resource; and
    provide, by the user device to the user, second content of a second resource as a second response to the second query, the second resource being identified by the search system as responsive to a third query, the third query being a revised query generated by the search system based on (i) the second query and (ii) the context data based on the first content of the first resource, the third query including a term that is not included in the first query and is not included in the second query, and the term being based on the context data identified based on the first content of the first resource and provided to the search system by the user device.

2. The system of claim 1, wherein:
    the first query and the second query are spoken queries; and
    the first response and the second response are spoken responses.

3. The system of claim 1, wherein the third query includes a noun that replaces a pronoun in the second query, the noun being included in the context data.

4. The system of claim 1, the program instructions further being executable to:
    rank one or more resources using the context data; and
    select the second resource based on the ranking.

5. The system of claim 1, wherein:
    the second content comprises text; and
    providing, by the user device to the user, the second content of the second resource as the second response to the second query comprises speaking the text of the second content.

6. The system of claim 1, the program instructions further being executable to display, by the user device and in response to the second query, the second resource on a display of the user device.

7. The system of claim 6, wherein displaying, by the user device and in response to the second query, the second resource on the display of the user device comprises providing instructions to cause a web browser on the user device to open a tab and display the second resource in the tab.

8. The system of claim 1, wherein the context data is not included in the first query and is not included in the second query.

9. The system of claim 1, wherein the context data is obtained from a portion of the first resource that was viewed by the user.

10. A method, comprising:
receiving, by a user device, a first query from a user;
providing, by the user device, the first query to a search system;
providing, by the user device to the user, first content of a first resource as a first response to the first query, the first resource being identified by the search system as responsive to the first query;
receiving, by the user device, a second query from the user following the providing of the first response;
in response to receiving the second query, based on the first resource having been provided to the user, identifying, by the user device, context data based on the first content of the first resource;
providing, by the user device, to the search system, (i) the second query and (ii) the context data based on the first content of the first resource; and
providing, by the user device to the user, second content of a second resource as a second response to the second query, the second resource being identified by the search system as responsive to a third query, the third query being a revised query generated by the search system based on (i) the second query and (ii) the context data based on the first content of the first resource, the third query including a term that is not included in the first query and is not included in the second query, and the term being based on the context data identified based on the first content of the first resource and provided to the search system by the user device.

11. The method of claim 10, wherein:
the first query and the second query are spoken queries; and
the first response and the second response are spoken responses.

12. The method of claim 10, wherein the third query includes a noun that replaces a pronoun in the second query, the noun being included in the context data.

13. The method of claim 10, further comprising:
ranking one or more resources using the context data; and
selecting the second resource based on the ranking.

14. The method of claim 10, wherein:
the second content comprises text; and
providing, by the user device to the user, the second content of the second resource as the second response to the second query comprises speaking the text of the second content.

15. The method of claim 10, further comprising displaying, by the user device and in response to the second query, the second resource on a display of the user device.

16. The method of claim 15, wherein displaying, by the user device and in response to the second query, the second resource on the display of the user device comprises providing instructions to cause a web browser on the user device to open a tab and display the second resource in the tab.

17. A computer program product comprising one or more non-transitory computer-readable storage media having program instructions collectively stored on the one or more computer-readable storage media, the program instructions executable to:
receive, by a user device, a first query from a user;
provide, by the user device, the first query to a search system;
provide, by the user device to the user, first content of a first resource as a first response to the first query, the first resource being identified by the search system as responsive to the first query;
receive, by the user device, a second query from the user following the providing of the first response;
in response to receiving the second query, identify, by the user device, based on the first content of the first resource having been provided to the user, context data based on the first content of the first resource;
provide, by the user device, to the search system, (i) the second query and (ii) the context data based on the first content of the first resource; and
provide, by the user device to the user, second content of a second resource as a second response to the second query, the second resource being identified by the search system as responsive to a third query, the third query being a revised query generated by the search system based on (i) the second query and (ii) the context data based on the first content of the first resource, the third query including a term that is not included in the first query and is not included in the second query, and the term being based on the context data identified based on the first content of the first resource and provided to the search system by the user device.

18. The computer program product according to claim 17, wherein:
the first query and the second query are spoken queries; and
the first response and the second response are spoken responses.

19. The computer program product according to claim 17, wherein the third query includes a noun that replaces a pronoun in the second query, the noun being included in the context data.

20. The computer program product according to claim 17, the program instructions further being executable to:
rank one or more resources using the context data; and
select the second resource based on the ranking.

* * * * *